Figure 2:
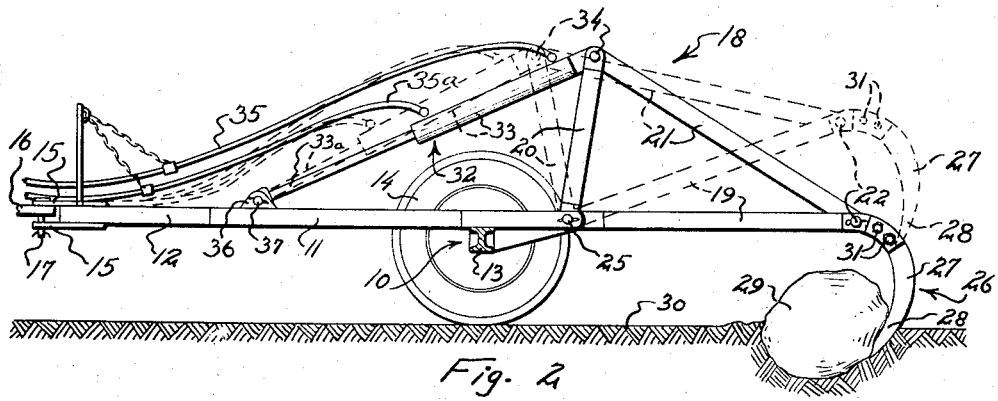

April 7, 1959     C. W. MONSON     2,880,526

ROCK REMOVER DEVICE

Filed Feb. 9, 1954

INVENTOR
CLARENCE W. MONSON
BY Williamson, Williamson,
Schroeder & Adams
ATTORNEYS

United States Patent Office 2,880,526
Patented Apr. 7, 1959

2,880,526

ROCK REMOVER DEVICE

Clarence W. Monson, Willmar, Minn.

Application February 9, 1954, Serial No. 409,158

1 Claim. (Cl. 37—2)

This invention relates to a rock removing device and more particularly to an apparatus for digging and removing individual large rocks of a nature inherently difficult or impossible to remove by ordinary stone and rock picking devices.

In prior art stone and rock pickers emphasis is laid on clearing a field having rocks, stones and the like therein by covering a swath of pre-determined width and making the required number of passes across the field to completely cover the total area thereof. The object of clearing the field is to remove non-productive objects having a size above that of the space between the tines which are disposed for the width of the swath. The field will then become tillable and the total area of the field may be devoted to growing crops or converting to such other purposes as grass lands. If, during the swathing operation, a rock is encountered which is too large for the picker to handle the usual procedure is to sub-divide the rock by such means as blasting with dynamite or to dig away the earth at least partially around the rock and then to bring it to the surface of the field by hitching a chain around the rock and pulling it out by such means as a tractor hitched to the chain at its opposite end.

However, since there are usually a large number of rocks having a size smaller than to require blasting, yet larger than can be handled with a swath-type picker, it is desirable to mark the locations of such rocks after having cleared the field of stones and smaller rocks, then to remove these rocks by a rapidly operating apparatus which will have a large concentration of power yet which can be quickly moved from location to location in order to accomplish the work.

It is therefore an object of the invention to provide an apparatus which will efficiently remove individual large rocks from a field, both from a partially buried position and from a totally buried position closely underneath the surface of the ground.

Another object of the invention is to provide an apparatus having a high output of power and a rugged quality with reference to the weight and power input required in the apparatus.

It is a still further object of the invention to provide a rock removing device of the class described wherein the location of parts and the shape of the digging head is such as to roll a large rock to the surface of the ground with a minimum of drag and with a maximum of purchase.

Figure 1:
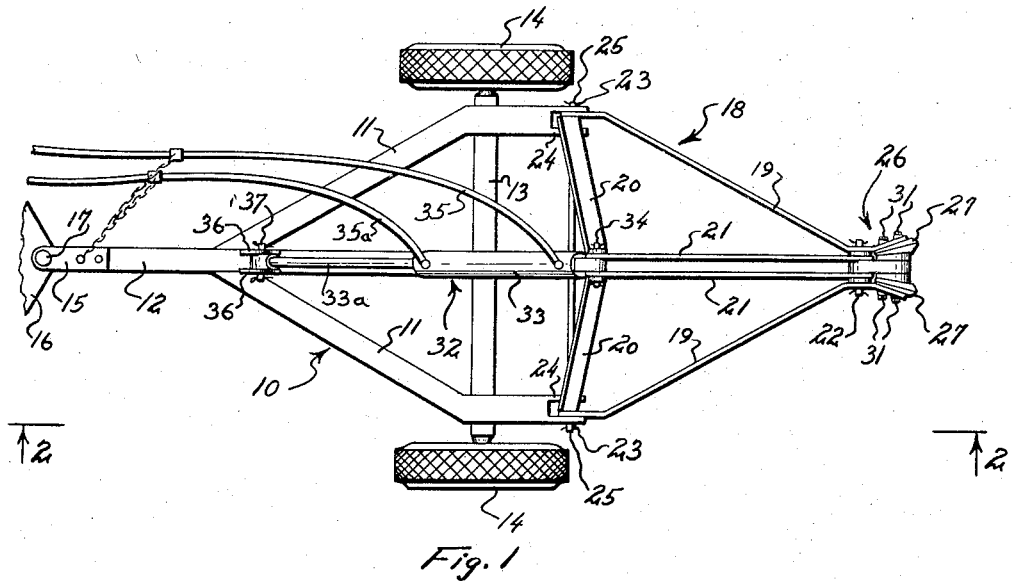

These and other objects and advantages of my invention will more fully appear from the following description made in connection with the accompanying drawings wherein like reference characters refer to similar parts throughout the several views and in which:

Fig. 1 is a top plan view of the rock removing device with the digger head in operative position; and Fig. 2 is a side view of the rock removing apparatus taken on the vertical section line 2—2 of Fig. 1 and in normal operating position with respect to a large rock. The hitch mechanism is shown apart from the powered vehicle to which it is attached and the dotted line configuration indicates a raised position of the swingable frame and digger head.

Referring now more particularly to the drawing my apparatus comprises a wheeled supporting structure indicated generally at 10 and having supporting braces 11 secured to a drawbar 12 and further secured and tied together by an axel element 13 which is transverse to the supporting structure 10. A pair of wheels 14 may be rotatably mounted upon axel 13 for easy movement of the apparatus along the surface of the ground.

The device may have a hitch 15 which is adapted to be secured to a cooperative hitch plate 16 on a powered vehicle such as a tractor (not shown) and having the usual king-pin 17 to permit horizontal swinging of the device with relation to the powered vehicle. It is understood, of course, that the apparatus may be either drawn or pushed and may be either pivotally mounted to a vehicle or secured in rigid relation with the frame of such vehicle.

A swingable frame 18 is pivotally mounted to the supporting structure 10 as shown in Figs. 1 and 2. The swingable frame preferably constitutes a pair of side arms 19 and an outwardly extending set of braces 20 which, in turn, are rigidly connected through brace means 21 with the rearwardly converging braces or arms 19 to be secured together as by pin 22. The swingable frame 18 is pivotally secured to the wheeled supporting structure at a convenient location such as to the rear of the supporting structure and the spaced side points as at 23, 23. Rearwardly extending ends of the brace 11 may be bifurcated at 24 and pivotally mounted by such means as a pin 25 through the respective bicurcated ends 24 and the forwardly extending ends of arms or braces 19.

Mounted rigidly to the swingable frame and rearwardly of the pivotal mounting position defined by the pins 25, is a digger head 26. The digger head has at least one downwardly extending tooth element and preferably has a small number of teeth 27 which are arranged in bifurcated fashion so as to terminate in spaced points 28. In the form shown in the drawing, the digger head constitutes two teeth 27, each of which is somewhat flattened so as to offer maximum strength with minimum resistance when drawn through or inserted into the ground. The tooth elements 27 are preferably maintained at constant spacing so as to terminate in points 28 curved forwardly and downwardly with respect to the pivot position 25. The downward curved relation of the tooth means of the digger head with relation to the pivot position between the supporting frame 10 and the swingable frame 18 is important in effecting removal of a large rock 29 which may be completely embedded or partially embedded in the surface of ground 30. The individual teeth 27 may be removably secured in the digger head arrangement by such means as mounting bolts 31 as shown in Figs. 1 and 2.

Extensible and retractable power means 32 is attached to the swingable frame 18 at a position radial to the pivotal mounting axis 25. The upper apex of the frame braces 21 and 20 forms a convenient and strong location for applying the required power in swinging the frame. The extensible and retractable element preferably comprises a hydraulic jack having a cylinder 33 pivotally secured at 34 to the swingable frame 18 and having a piston rod 33a pivotally secured to the supporting structure 10 through a connection such as brackets 36 and pivot pin 37 as shown. The hydraulic jack 32 may have the usual hydraulic supply lines 35 and 35a connected to respective ends of cylinder 33 so as to be capable of powering the piston rod 33a either in an extending motion or a retracting motion. The other ends of the supply lines 35 and 35a are connected to a suitable source of hydraulic power controlled by usual valve means. Such equipment is not shown in the present disclosure but constitutes ordinary equipment in connection with vehicles such as tractors.

In the use and operation of my rock removing device the drawbar 12 of the apparatus is hitched to the hitch plate 16 of a power vehicle (not shown) and the device is transported to a rock 29 of the type which is too large to be removed by ordinary stone and rock picking swathers. The points 28 of the digger head 26 are then caused to lower into the surface of ground 30 as the device approaches rock 29. This movement is accomplished by extending the power means 32 so as to cause the swingable frame to rotate in a clockwise direction about the pivotal axis defined by pins 25. Forward movement of the device will cause the toothed elements 27 to dig into the ground even though the weight of the apparatus would not be sufficient to accomplish this by itself. The points 28 are caused to contact the rock 29 at some position under the outermost periphery so as to cradle the rock with respect to the digger head. The digger head will then be substantially in the position and relation to rock 29 as illustrated in Fig. 2. The operator may then simultaneously or alternately cause the apparatus to be forcefully moved in an upward direction and cause the extensible and retractable means 32 to move the swingable frame 18 in a counterclockwise direction to pull the rock 29 forwardly and upwardly. Since the pivotal center is at 25 and forwardly of rock 29 the combined movements will cause the rock to be rolled outwardly onto the surface of ground 30. In some instances it may be advisable to alternate movements in loosening and raising the rock 29. In such instances the tractor may be held in braked condition and the swingable frame 18 worked upwardly and downwardly to loosen the rock before applying forward motion to the tractor.

It may thus be seen that I have devised a simple and efficient rock removing device in which a large rock may be lifted and rolled to the surface of the ground rather than forcefully dragged through the resisting earth in accomplishing removal of the rock from a submerged position to a location upon the surface of a field where the rock can be subsequently transported from the field.

It will, of course, be understood that various changes may be made in the form, details, arrangement and proportions of the parts without departing from the scope of my invention which consists of the matter shown and described herein and set forth in the appended claim.

What is claimed is:

An attachment for a tractor for bringing a large rock to the surface of the ground, comprising a supporting structure having means for attaching it to the tractor, ground-engaging means supporting said structure at a predetermined elevation above the ground surface, a vertically swingable frame extending generally rearwardly from the supporting structure and having pivot means connecting it to the supporting structure, said frame having substantially horizontal and vertical members extending outwardly from the pivot means and also having a rearwardly and downwardly inclined frame member interconnecting the outer ends of said horizontal and vertical members extensible and retractable power means having opposite ends swingably connected to said outer ends of the vertical members at their junction with the inclined members of the swingable frame and to said supporting structure at a position forwardly from said pivot means and at a position forwardly of said ground-engaging means for moving the frame in vertically swingable oscillation, and a digger head rigid with the frame and spaced rearwardly from said pivot means and having a pair of downwardly extending, forwardly curved rigid teeth projectible into the ground, spaced transversely from each other a distance less than the width of such a rock whereby to cradle the rock therebetween and roll the rock upwardly and forwardly out of the ground as the frame is swung upwardly in synchronism with forward movement of the tractor.

References Cited in the file of this patent

UNITED STATES PATENTS

| | | |
|---|---|---|
| 851,732 | Deschambault | Apr. 30, 1907 |
| 2,284,388 | Gurries | May 26, 1942 |
| 2,624,959 | Anderson | Jan. 13, 1953 |
| 2,760,283 | Lee | Aug. 28, 1956 |

FOREIGN PATENTS

| | | |
|---|---|---|
| 462,183 | Canada | Jan. 3, 1950 |
| 483,528 | Canada | May 27, 1952 |
| 489,332 | Canada | Jan. 6, 1953 |
| 234,730 | Switzerland | Feb. 16, 1945 |